INVENTORS
RICHARD T. BURNETT
BY CLETUS MCLANE

ATTORNEY

Oct. 28, 1958  R. T. BURNETT ET AL  2,857,989
BRAKE
Filed Oct. 30, 1953  5 Sheets-Sheet 2

INVENTORS
RICHARD T. BURNETT
BY CLETUS McLANE
Cecil J. Avery
ATTORNEY

INVENTORS
RICHARD T. BURNETT
BY CLETUS MC LANE

ATTORNEY

Oct. 28, 1958
R. T. BURNETT ET AL
2,857,989
BRAKE
Filed Oct. 30, 1953
5 Sheets-Sheet 5
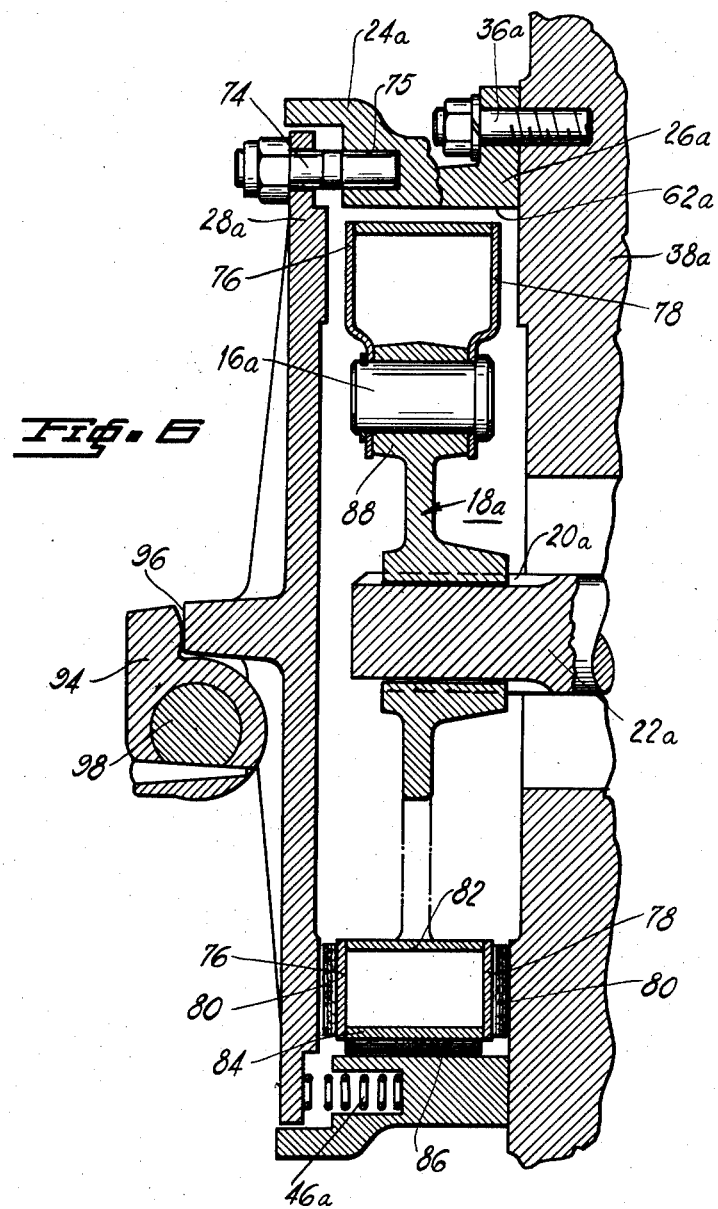
INVENTORS
RICHARD T. BURNETT
BY CLETUS McLANE
Cecil D Areng
ATTORNEY United States Patent Office 2,857,989
Patented Oct. 28, 1958

2,857,989

BRAKE

Richard T. Burnett and Cletus McLane, South Bend, Ind., assignors to Bendix Aviation Corporation, South Bend, Ind., a corporation of Delaware Application October 30, 1953, Serial No. 389,212

21 Claims. (Cl. 188—70)

This invention relates to a brake having either or both of the following attributes: the engagement of one friction means is brought about as the result of engagement of another friction means and/or a plurality of stator surfaces are engaged by friction means associated with a single rotor unit.

An important object of this invention is to combine in a single brake assembly the best operating features of disk and drum (or shoe) brakes, obtaining the self-energization inherent in certain types of drum brakes, while avoiding the loss of pedal travel which results from drum expansion in conventional drum brakes.

Another important object of this invention is to obtain improved heat dissipation from the brake elements, with a consequent significant reduction of "fade" as a result of an appreciable increase in the swept friction element engaging area, obtained by utilizing both disk and cylindrical friction areas.

A further object of the invention is to provide a U-shaped cross section stator consisting of a two piece assembly one part of which is actuable to apply the brake.

Among the other advantages obtained by using the present invention are: (a) improved conductance of heat by providing larger capacity reservoir for kinetic energy dissipated in the brake; (b) protection of the braking components from external conditions and contamination from foreign material; and (c) economical realization of the foregoing objects and advantages by means of a simple low-cost construction.

The present invention is particularly adapted for use as a tractor brake. The brakes in present day tractors are used for steering the vehicle and with the more modern plowing technique, viz. contour plowing, the brakes are in almost continual use to assist the driver in steering the tractor. The result of this almost continuous use of the brakes is that the operating temperatures are appreciably elevated making the brake more susceptible to fade. This condition is aggravated by the reduced speed of the tractor since convection cannot be relied on as a factor in reducing braking temperature. The present invention proposes to solve the problem of high kinetic energy absorption which causes fade of the brakes by utilizing improved conduction of heat away from the braking components, thus, reliable braking performance may be realized under the strenuous conditions imposed by tractor braking.

This improvement in rate of heat transfer away from the braking components so as to make for a cooler operating brake has been realized in part by providing a more efficient heat reservoir in a material advance from what has heretofore been employed. At the same time we have not sacrificed braking effectiveness to obtain reduced operating temperatures but have combined the two features in a brake, the cost of which is comparable to conventional brakes now being supplied to tractor manufacturers.

The above and other objects and features of the present invention will appear more fully hereinafter from a consideration of the following description, taken in connection with the accompanying drawings, wherein a plurality of embodiments of the invention are illustrated by way of example.

In the drawings:

Figure 6 is a sectional view taken on the line 6—6 of Figure 5.

Figure 1:
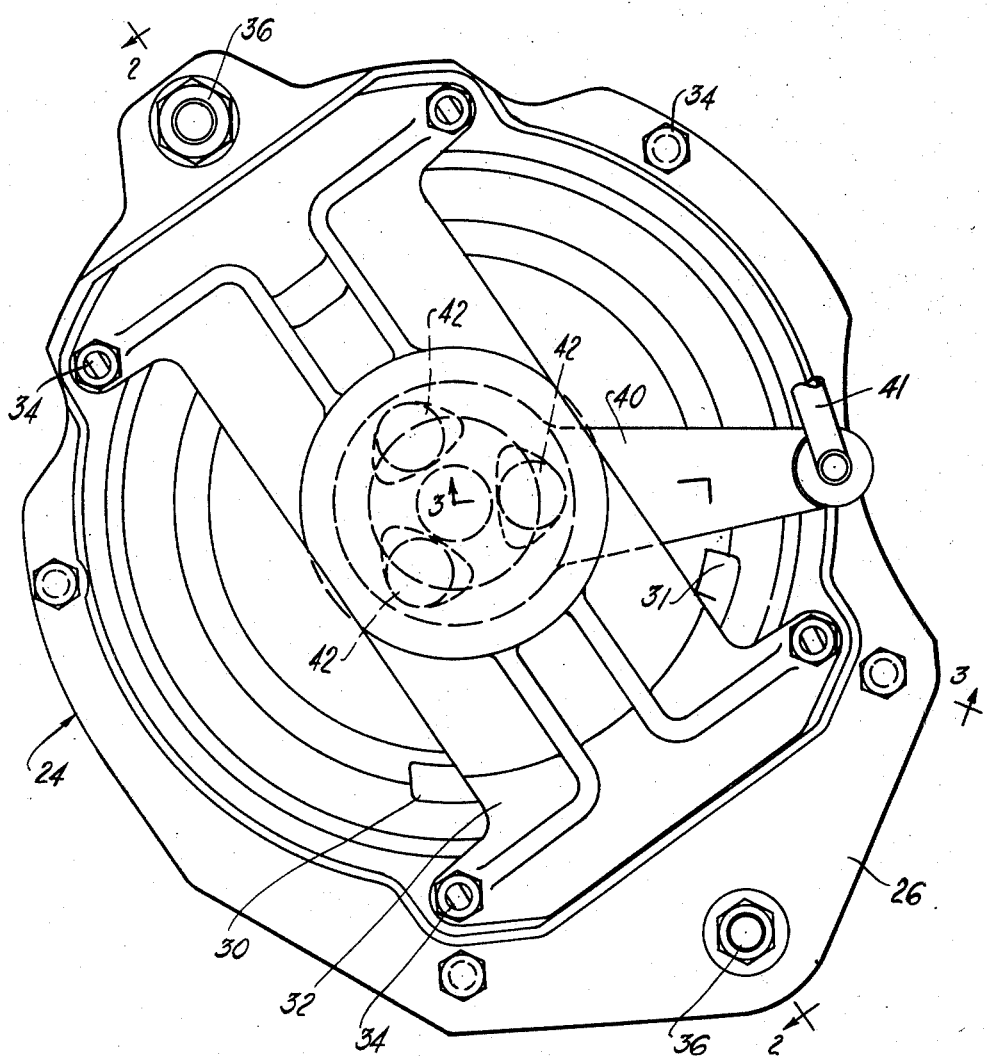
Figure 1 is a side elevation of a brake assembly viewed toward the inboard side of the tractor.
Figure 2:
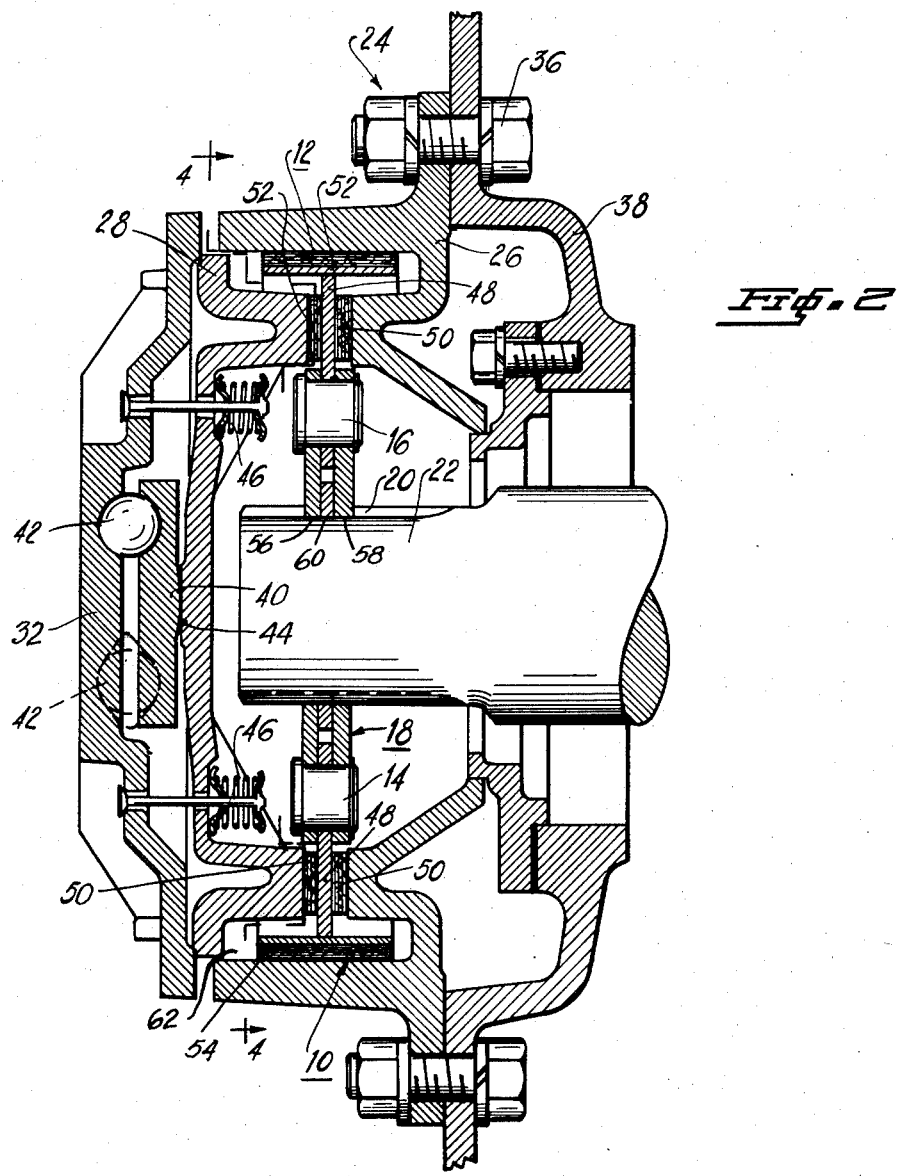
Figure 2 is a sectional view taken on the line 2—2 of Figure 1.

Referring to the embodiment shown in Figures 1 to 4, a pair of friction units 10 and 12 are pivotally mounted on pins 14 and 16 secured to a rotor 18 having a splined connection 20 with a rotatable member such as shaft 22.

A stator designated generally by reference numeral 24, comprises a two-piece assembly consisting of a housing 26 and pressure plate 28. The pressure plate 28 has two-spaced anchors 30 and 31 abutting a backing plate 32 operatively secured to housing 26 by a plurality of fastening members 34. The stator 24 is suitably secured by fastening members 36 to a nonrotatable part of the vehicle such as undercarriage 38.

An applying lever 40 is interposed between the backing plate 32 and pressure plate 28. A plurality of camming devices 42 consisting of ball-ramp combinations are received between the applying lever 40 and backing plate 32 to impart axial thrust on the pressure plate 28 upon circumferential movement of the applying lever 40 about the point of abutment 44 with pressure plate 28. An applying cable or rod 41 is attached to the end of the applying lever and leads to an operator controlled pedal or handle (not shown) which is accessible to the operator for applying the brake. A series of return spring devices, as for example those shown at 46, may be used to yieldably urge the pressure plate 28 to retracted position.

Each of the identically constructed friction units 10 and 12 consists of a web 48 having friction pads 50 on either side thereof. The friction units 10 and 12 are provided with a transverse rim 52 having friction material lining 54 along a portion of the periphery of the brake unit. It will be noted from Figure 4 that the friction units 10 and 12 are symmetrical about a vertical plane passing through the pivotal mounting pins 14 and 16. The symmetry of the friction units about this plane taken through the pivotal mounting gives balance to the unit, a consideration which will become more important later in this description in connection with the operation of the device.

The rotor 18 serving as a carrier for the friction units 10 and 12, consists of two plates 56 and 58 with an inserted annulus 60 keeping them sufficiently spaced apart to permit the web 48 of the units 10 and 12 to be guided therebetween and yet permit pivotal movement of each unit about pins 14 and 16.

For yieldably disengaging the friction material lined rims 52 of the units from surface 62 of housing 26 we employ a centralizing spring arrangement illustrated at 64. This centralizing mechanism consists of superposed openings 66 and 68 in the rotor and friction units respectively with a spring 70 received therein and positioned on ears 72 formed in the web of each of the units to maintain the spring in operative position. The spring 70 is longitudinally compressed and fitted within openings 66 of plates 56 and 58. When the web 48 moves in either direction, it compresses the spring 70 even further, forcing the end of the spring toward one side or other of the opening 66 depending upon the direction of movement of the web 48 (see Fig. 3). The compressed spring urges the web to its original position whereby the shoe is disengaged from the rotor.

Figure 5:
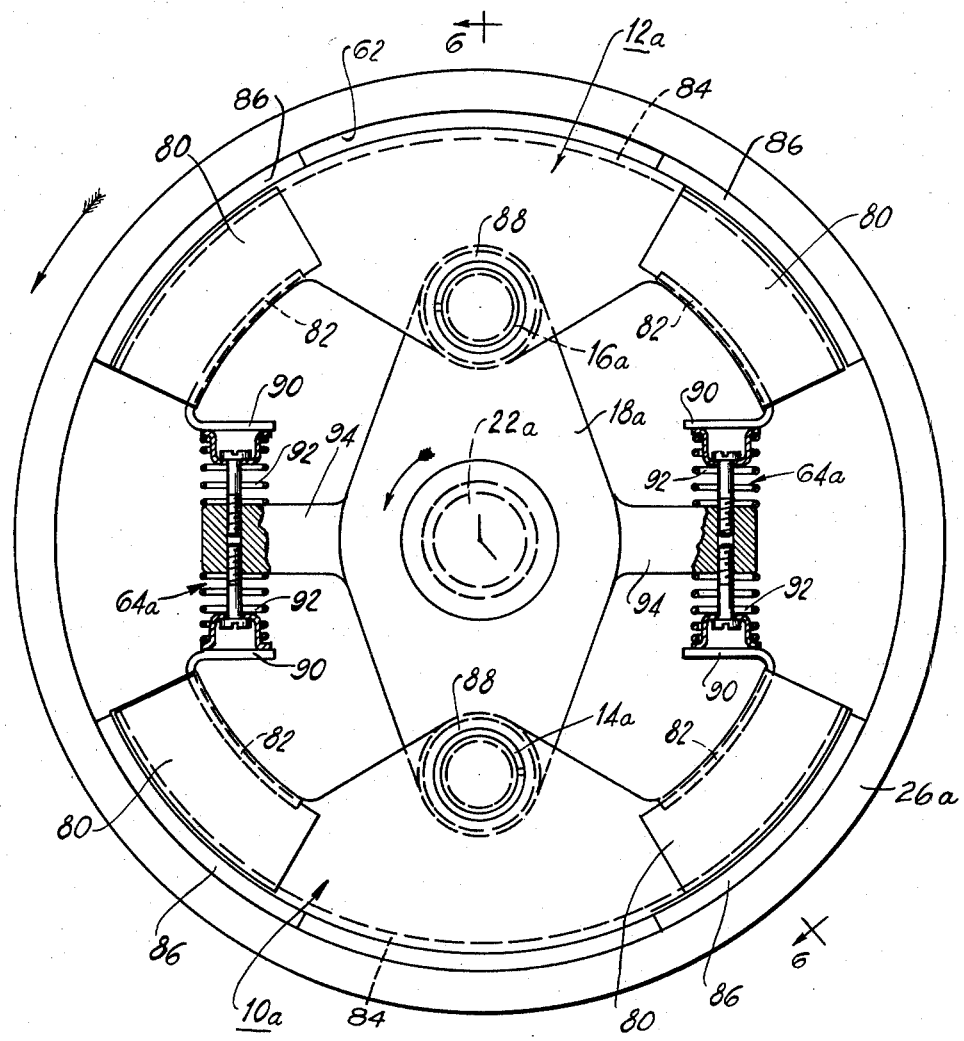
Figure 5 is a side elevation of a second embodiment of the invention showing the friction units and rotor, the stator and pressure plate being removed to better illustrate the friction units and supportive rotor.

In the description of Figures 5 and 6 which follows, all parts of the brake assembly corresponding to those previously described are identified by the same reference numeral with the subscript *a* affixed thereto.

A pair of friction units 10a and 12a are pivotally mounted on pins 14a and 16a secured to rotor 18a having a splined connection 20a with shaft 22a.

A stator designated generally by reference numeral 24a includes a housing 26a and pressure plate 28a. A plurality of circumferentially spaced guide pins 74 are carried by the pressure plate 28a and slidably received in openings 75 in the housing 26a to guide the axial movement of pressure plate 28a. The stator 24a is suitably secured by fastening members 36a to a non-rotatable part of the vehicle such as the undercarriage 38a.

The friction units 10a and 12a are identically constructed; both are symmetrical about a vertical plane passing through the axes of pins 14a and 16a. The friction unit includes two spaced-apart disk surfaces 76 and 78 having friction material lining 80 thereon; transversely joining the two spaced disk surfaces 76 and 78 are rims 82 and 84. The rim 84 is provided with friction material lining 86 along a portion of the periphery thereof. The spaced apart disk surfaces 76 and 78 of each of the friction units are positioned on either side of a boss 88 formed on the outer edge of the rotor 18a. The boss of each unit is formed with an opening for the reception of pins 14a and 16a which also pass through openings formed in sides 76 and 78 to retain the respective friction units in operative position.

For yieldably disengaging frictional contact of sides 76 and 78 with stator 24a we provide a plurality of return spring mechanisms 46a which are positioned in openings in the housing 26a and bear against the pressure plate 28a at the underside thereof to urge the pressure plate 28a to retracted position.

The shoe portions of each of the units are disengaged by means of a centralizing spring arrangement designated generally by reference numeral 64a. Side 82 of each of the friction units is bent back on itself at the ends thereof to form ears 90; springs 92 bear at one end against the ear 90 and at the other end against projections 94 of the rotor 18a to resist pivotal movement of the friction unit about the respective anchor 14a and 16a. The centralizing action of the springs 92 disengages the shoe portions of the friction units since each of the springs at either end of the unit are equally loaded and by tending to balance each unit, they prevent engagement of the shoe portions of the brake by imposing a symmetrical position on the unit. Neither of the springs has the effect of applying the "shoe" portion of the brake since they are oppositely acting and exert equal force nullifying their individual effect on actuation of the shoe portion of the brake.

To apply the brake we provide a cam actuator 94 bearing against a flat surface 96 at the center of the pressure plate 28a. Turning of shaft 98 forces cam 94 against surface 96 causing frictional interengagement of the disk surfaces 76 and 78 of each of the friction units with the spaced sides of the stator 24a.

Operation and function of the embodiment of Figures 1 to 4 are as follows: to apply the brake, lever 40 is turned in a counter-clockwise direction pivoting at point 44 on thrust plate 28. When the lever 40 is rotated the camming devices 42 interposed between the backing plate 32 and the lever 40 impart an axial thrust on applying lever 40 which is transmitted to the pressure plate 28 through the contact point 44. The pressure plate 28 frictionally engages the pads 50 on the web portion 48 of each of the units 10 and 12. Pressure plate 28 is moved axially to clamp the disk elements 50 of units 10 and 12 between engaging surfaces of the housing 26 and pressure plate 28. It will be noted that each of the friction units 10 and 12 is free to move axially by reason of the splined connection 20 on shaft 22 thereby permitting complete frictional interengagement of the disk surfaces on each of the units with adjacent contacting sides on the pressure plate 28 and the housing 26.

Figure 4:
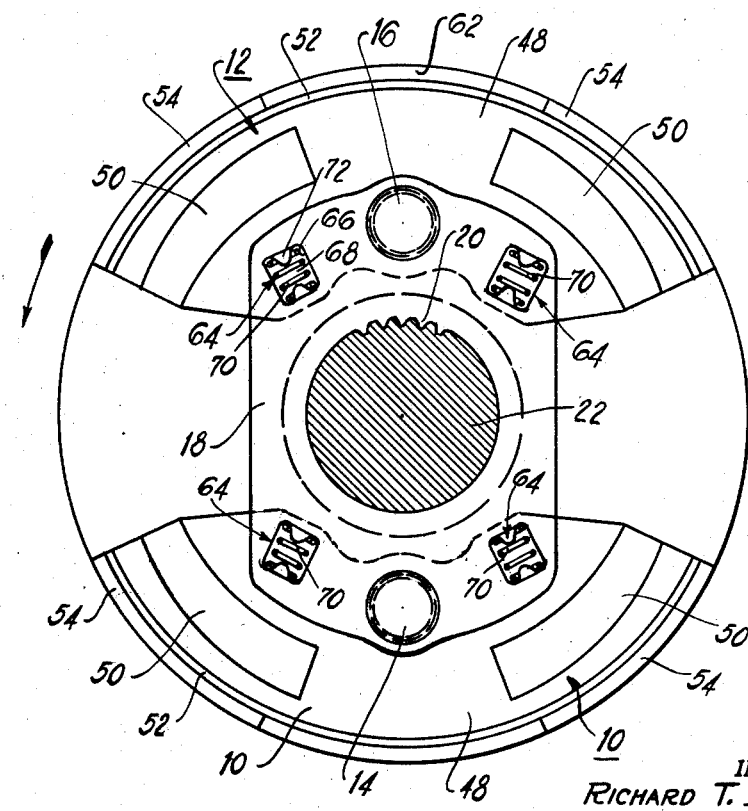
Figure 4 is a side view taken on the line 4—4 of Figure 2 illustrating the rotor with friction units and return spring mechanism.

Assuming rotation of the rotor 18 in the direction indicated in Figure 4 the torque reaction from the disk braking of units 10 and 12 tends to produce a clockwise pivotal actuation of unit 10 about the pin 14 applying the right hand shoe portion of the unit against the adjacent cylindrical surface 62 of the housing 26. The effect of disk braking of unit 12 produces clockwise acuation thereof about pin 16 radially outwardly applying the left hand shoe portion of unit 12 against the adjacent cylindrical surface 62 of the housing 26.

It will be apparent from the description of the operation of the device thus far that the braking effort of units 10 and 12 consists of two distinct phases; disk braking which is operator controlled and applied by input force of the lever 40, and the "shoe braking" which is a product of the torque reaction of the disk braking. This composite disk and shoe braking effort has a two-fold advantage: first, the braking effort is distributed over a greater area and hence operating temperatures may be reduced to alleviate fading, and second, while the desirable pedal characteristics of a disk brake may be obtained yet we realize a preferred degree of self-energization which is inherent in certain shoe type brakes.

To release the brake, the lever 40 is rotated in a clockwise direction (see Figure 1) to resume its initial position and the camming devices 42 release axial applying thrust on the pressure plate 28. The return springs 46 yieldably disengage frictional contact of the stator sides with the disk elements on the friction units 10 and 12, releasing the clamping effect on the friction units by the housing 26 and pressure plate 28.

When either of the units 10 and 12 is pivotally actuated to apply the shoe portion on either end thereof, one of the springs 70, mounted in the superposed openings 66 and 68 of the rotor and friction unit is loaded, tending to resist further pivotal actuation; hence when the input effort is released the spring 70 centralizes the unit about pins 14 and 16 disengaging the applied shoe portion.

Figure 3:
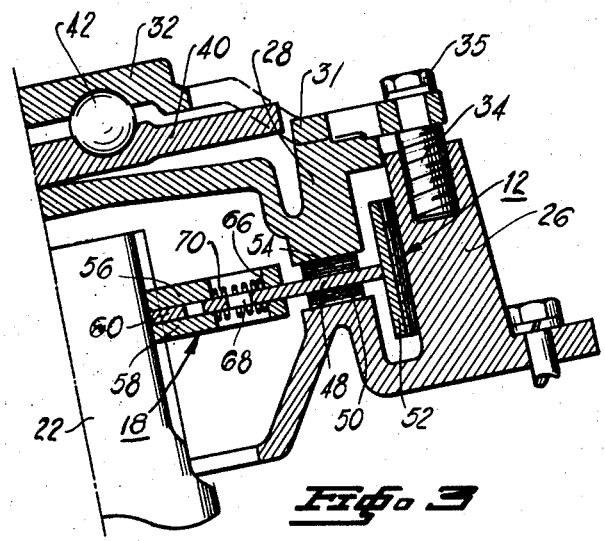
Figure 3 is a sectional view of one half the brake assembly taken on the line 3—3 of Figure 1.

When the lining 50 on the disk elements of the unit has worn sufficiently to require an adjustment, the fastening devices 34 threadedly received in housing 26 are screwed down into the openings formed therein. The fastening members 34 have stepped diameters as shown in Figure 3 and after the member 34 is screwed into the opening in housing 26, the nut 35 may then be turned down forcing the backing plate 32 toward the inboard side of the brake. As the backing plate 32 is forced toward the housing 26 by nut 35, the lever 40 and pressure plate 28 are moved toward the casing 26 reducing the clearance of the engaging side of the pressure plate 28 with the disk elements of the friction unit. Four of these fastening members 34 are located between the backing plate 32 and the housing 26 so that the adjusted position of the backing plate 32 is square with respect to the pressure plate 28 and other braking components.

The fastening members 34 in addition to being adjusting means also transmit torque reaction from engagement of the pressure plate 28 with the disk elements of units 10 and 12. When the pressure plate 28 frictionally engages the units on rotor 18 with the rotor turning in the direction indicated by the arrow in Figure 4, the tendency of the pressure plate to move circumferentially is prevented by engagement of the anchor 30 with backing plate 32. The pressure plate 28 thus anchors against an engaging surface of backing plate 32. The anchoring load of the pressure plate 28 on backing plate 32 is transmitted to the casing 26 through the fastening devices 34. During braking with rotation of the rotor 12 in the opposite direction the torque reaction is transmitted to anchor 31 and the load is then transferred to casing 26 through the fastening devices 34 in the same manner previously described.

The operation of the embodiment shown in Figures 5 and 6 is substantially the same as that of the previous embodiment. Assuming a direction of movement of the rotor indicated in Figure 5, the pressure plate 28a is axially applied, clamping the disk surfaces 76 and 78 of units 10a and 12a between the adjacent sides of the stator 24a. Each of the units 10a and 12a is pivoted in a clockwise direction about pins 14a and 16a applying respectively the right hand shoe portion of unit 10a and the left hand shoe portion of unit 12a against the adjacent cylindrical surface 62a of the stator 24a. Splined connection 20a of the rotor 18a with the shaft 22a enables sliding movement of the rotor to insure complete frictional interengagement of the disk elements with adjacent sides of the stator 24a.

The torque reaction from interengagement of the pressure plate 28a with the adjacent disk element of the friction unit is transmitted through the connecting devices 74 and casing 26a to the undercarriage 38a. When the operator's applying force is released the pressure plate 28a is urged toward the left by return springs 46a. The centralizing spring arrangement 64a releases contact of the applied shoe portion of the unit, yieldably urging the shoe to retracted position.

During braking with opposite direction of rotation of the rotor, disk braking of units 10a and 12a produces counterclockwise actuation of units 10a and 12a radially applying the left hand portion of unit 10a and the right hand portion of unit 12a against the adjacent cylindrical surface 62a of the stator 24a. The torque reaction from engagement of the pressure plate 28a with the adjacent disk element of the brake unit is transmitted through the fastening devices 74 to the undercarriage 38a in the same manner previously described.

Although only two embodiments of my invention have been described it will be understood by those skilled in the art that the objects of this invention may be obtained by use of constructions different in certain respects from those disclosed without departing from the underlying principles of the invention.

We claim:

1. A brake comprising a backing plate, a pressure plate, an applying lever operatively connected to said pressure plate, a plurality of camming devices between said backing plate and applying lever, a rotor, a plurality of friction units pivotally mounted on said rotor, said friction units including oppositely facing friction elements and a transversely located friction element, a stator having two friction element engaging surfaces, said pressure plate being axially movable into frictional engagement with one of the oppositely facing friction elements of said units thereby forcibly engaging the other of said oppositely facing friction elements with a surface of said stator, the interengagement of said pressure plate and rotor with the oppositely facing friction elements producing pivotal actuation of said units thereby applying the transversely located friction element thereof against a second surface of said stator, means for yieldably disengaging frictional contact of said pressure plate and stator with said brake units, and adjusting means threadedly received in said backing plate and stator to define the axial displacement therebetween determining the clearance of the oppositely facing friction elements of said units from said pressure plate and stator.

2. A brake comprising a nonrotatable drum consisting of three friction element engaging sides, one of said sides being in detachable relation with said drum, an axially movable rotatable member, a plurality of T-section friction units pivotally secured to said rotatable member, each of said friction units including oppositely facing friction surfaces and a transversely located friction surface, means for applying axial thrust on the detachable side of said drum to frictionally engage the oppositely facing friction surfaces of said units with substantially parallel sides of said drum, torque reaction from engagement of said oppositely facing surfaces of said units with said drum producing radial actuation of the transversely located friction surface of said units against the third side of said nonrotatable drum, means for varying spaced apart relationship of the sides of said drum engaging the oppositely facing friction surfaces of said units, means for yieldably disengaging frictional engagement of the oppositely facing friction surfaces of said units with said drum, and torque taking abutments on the detachable side of said drum engaging a nonrotatable member to resist circumferential movement of said detachable side in either direction.

3. A brake comprising a backing plate, an axially movable pressure plate, an axially movable applying lever abutting said pressure plate, a plurality of camming devices interposed between said backing plate and applying lever for exerting brake applying thrust upon relative circumferential movement therebetween, a rotor, a plurality of friction units pivotally mounted on said rotor, said friction units having two oppositely-facing friction material lined sides and a transverse friction material lined side, a stator having a disk-like surface and a transverse substantially cylindrical surface, axial actuation of said pressure plate producing frictional interengagement of the oppositely facing sides of said units with said stator and pressure plate thereby pivotally applying the transverse sides of said units against the cylindrical surface of said stator, means for yieldably disengaging the transverse sides of said units and the cylindrical surface of said stator, and means for yieldably urging said pressure plate to retracted position.

4. A brake comprising a rotor adapted for axial movement, a pair of brake units rotatable with said rotor and mounted thereon for pivotal movement on an axis paralled to the axis of rotation of said rotor, each of said brake units including a web, friction pads on opposite sides of said web, and two circumferentially spaced friction material lined rims, one on each side of the pivotal mounting portion of each of said units, resilient means received in laterally registering openings in said units and rotor for resisting relative movement therebetween, and a stator having two parallel disk surfaces and a cylindrical surface, said two disk surfaces adapted to engage the friction pads on opposite sides of the webs of said units, the torque reaction from engagement of said surfaces with the oppositely facing friction pads on said units producing turning of said units at the pivotal mounting portion thereof which thereby radially applies the friction material lined rim of each of said units into engagement with the cylindrical surface of said stator.

5. A brake comprising a rotatable member, at least one friction-producing unit pivotally mounted on said member, said unit including three friction-producing elements, two of said elements being disposed as oppositely facing surfaces and the third element being disposed transversely of said unit, a stator having three friction element engaging surfaces located respectively adjacent the friction producing elements of said unit, one of the friction element engaging surfaces of said stator being axially movable to produce engagement of the oppositely facing surfaces of said unit and the sides of said stator adjacent thereto, said engagement producing pivotal actuation of said unit radially applying the third friction element thereof against an adjacent surface of said stator, means for yieldably disengaging the frictional contact of said elements from adjacent surfaces of said stator, and torque taking means preventing circumferential movement of said stator in either direction.

6. A brake comprising an axially movable rotor, a pair of brake units pivotally associated with said rotor, each of said brake units including two spaced disk elements, a two part stator having spaced sides between which said disc elements are located, one of the parts of said stator being axially movable to establish frictional engagement between the disk elements of said units and said sides of said stator, a plurality of circumferentially spaced guide pins interconnecting the two parts of said stator, said guide pins being further adapted to transmit torque reaction from engagement of the axially movable part of said stator with said brake units to the other part of said stator, and means for yieldably disengaging frictional application of the axially movable part of said stator with said brake units.

7. A kinetic energy absorbing device comprising a rotor, a driven member having splined connection with said rotor permitting axial movement of said rotor, a pair of brake units pivotally associated with said rotor and rotatable therewith, three friction-producing surfaces on each of said brake units, two of said surfaces constituting axially spaced disk elements and the third a shoe element, the latter of which is radially applied by torque reaction from braking of said disk elements, and a two-part stator, one part providing braking surfaces for one of said disk elements and said shoe element and the other part being axially movable into frictional contact with the other disk element of said brake units to thereby clamp the disk elements between said two parts of said stator.

8. A kinetic energy absorbing device comprising a two-piece stator, a rotor, and at least one brake unit pivotally mounted on said rotor, said brake unit including axially disposed disk elements and a radially applied shoe element actuated by torque reaction from engagement of said disk elements with said stator, one part of said two-piece stator being axially movable to clamp the disk elements of said brake unit between the two parts of said stator.

9. A brake comprising relatively rotatable and non-rotatable members, at least one pivotally mounted brake unit having a plurality of friction-producing elements, the torque reaction from application of two of the friction-producing elements of said unit being utilized to apply other elements of said unit, and an axially movable pressure plate for applying said brake.

10. A brake comprising a two-piece stator having a relatively axially movable portion, a rotatable carrier plate having splined connection with a driven member permitting axial movement therebetween, and a plurality of composite disk and shoe brake units pivotally associated with said carrier plate and engageable with contiguous surfaces of said drum.

11. A brake comprising a plurality of composite disk and shoe brake units associated with a rotatable carrier plate and adapted for pivotal movement thereon, and a stator having a plurality of friction element engaging surfaces engageable with said units, a portion of said stator being relatively axially movable to apply said brake.

12. In a brake, a fixed housing having a cylindrical braking surface and parallel sides each containing a plane braking surface, a rotor in the housing capable of axial movement, a braking device mounted on the rotor for pivotal movement, said braking device being equipped with parallel surfaces arranged for frictional engagement with said sides respectively and an arcuate surface arranged for frictional engagement with said cylindrical surface, one of said sides having axial movement with respect to said rotor for causing engagement between said sides and the respective parallel surfaces of said device, engagement of said sides with said parallel surfaces causing said device to pivot thereby rotating said arcuate surface into contact with said cylindrical surface, and means for moving said one side axially.

13. In a brake, a fixed housing, an axially shiftable rotor in the housing, a pressure plate mounted for axial movement with respect to said rotor, a braking device pivotally carried by said rotor and provided with two spaced apart parallel surfaces and an arcuate surface, said housing having a cylindrical surface for frictional engagement with said arcuate surface and a second surface located radially inwardly from said cylindrical surface for frictional engagement with one of said parallel surfaces, said pressure plate being equipped with a surface for frictional engagement with the other of said parallel surfaces, and means connected to said pressure plate to introduce axial motion thereto.

14. In a kinetic-energy-absorbing device, a two-part member providing two parallel disk and one cylindrical friction-element-engaging surfaces, one of said parts including one of said disk surfaces being movable to actuate said device, and at least one friction unit rotatable relative to said two part member and adapted for pivotal movement on an axis parallel to the axis of rotation, said friction unit including friction elements cooperable with each of the three surfaces of said member, the movable part of said member being actuatable along a line parallel to the axis of rotation to clamp the respective friction elements between the two parallel friction engaging surfaces of said member to produce a circumferentially retarding reaction force causing the friction unit to pivot and thereby radially apply into engagement with the cylindrical surface of said member the corresponding friction element of said unit.

15. A kinetic-energy-absorbing device comprising a housing and mounting plate which are relatively rotatable, said housing having both disk and cylindrical friction element engaging surfaces, at least one brake unit pivotally secured to said mounting plate on an axis parallel to the axis of rotation, said unit including a plurality of first friction producing elements and a second friction element disposed transversely to said first friction elements, means to actuate said device, and a portion of said housing movable in a direction parallel to the axis of rotation upon actuation of said device to accomplish frictional engagement of said first friction elements and the disk surfaces of said housing, the torque reaction from engagement of said first friction elements being utilized to pivot said unit and thereby apply the second friction element into engagement with the cylindrical surface of said housing.

16. A friction unit comprising a friction-material-faced arcuate rim, a web normal to said rim and connected to the under surface of said rim, said web having opposed parallel friction-material-faced surfaces normal to the facing on said rim, and means for mounting said friction unit for pivotal movement on an axis parallel to the surface of said friction material faced rim.

17. In the friction unit of claim 16 resilient means received in laterally registering openings in the web of said friction unit and the mounting means for resisting relative movement therebetween.

18. The friction unit of claim 16 in which said unit is symetrically constructed about the pivotal mounting for substantially equal utilization of the friction-material-faced arcuate rim in both directions of pivotal movement.

19. A kinetic-energy absorbing device, including a rotatable friction unit, a two part stator operatively associated with said friction unit, one of the parts of said stator having a cylindrical friction-element-engaging surface, the other part of said stator having an opposed disk-friction-element engaging surface which is movable relative to the first mentioned stator part in a direction parallel to the axis of rotation of said friction unit, said friction unit including a plurality of friction elements, each of said elements being operatively associated with a respective friction-element-engaging surface of said stator, and means for applying said device by forcing the movable portion of said stator into frictional engagement with the friction unit to engage the opposed stator parts with the associated rotating friction elements, the torque resulting from said frictional engagement being utilized to apply the friction element associated with the cylindrical surface of the first mentioned stator part.

20. In a kinetic-energy-absorbing device, a rotatable friction unit, a three-friction-surface stator operatively associated with said friction unit and fixed against rotation relative thereto, said stator including spaced apart friction surfaces one of which is arranged to move in a direction parallel to the axis of rotation of said unit to actuate the device, said friction unit being limitedly movable in a direction parallel to its axis of rotation and including oppositely disposed first friction elements engageable with the spaced friction surfaces of said stator and an arcuate second friction element disposed normal to said first friction element for movement in a radial direction relative to the axis of rotation of said unit, clamping of the oppositely disposed first friction elements between the movable friction surface of the stator and the spaced apart surface of said stator developing the torque reaction to move the arcuate second friction element radially into engagement with the third friction surface of the stator.

21. In a brake for use in tractor installations, a power driven shaft operatively connected to a tractor wheel, a braking unit including a radially inward portion which is rotatably mounted on said shaft and axially slidable thereon and a radially outward portion operatively connected to said first mentioned portion and movable relatively thereto, a number of braking surfaces on the braking unit, two of these surfaces being substantially parallel and a third surface substantially perpendicular to said two surfaces, and a stator means which is non-rotatable and arranged in juxtaposition with respect to each of said friction surfaces of said brake unit, said stator having an actuatable section which moves into and out of engagement with one of the surfaces of said brake unit to retard rotation thereof and thereby develop relative movement between the portions of said brake unit, and mechanically operated actuating means which produces initial actuation of said stator section with the associated friction surface of said brake unit.

References Cited in the file of this patent

UNITED STATES PATENTS

| 1,603,963 | Liebowitz | Oct. 19, 1926 |
| 1,789,957 | Connell | Jan. 27, 1931 |
| 1,928,630 | Penrose | Oct. 3, 1933 |
| 1,956,315 | Collins | Apr. 24, 1934 |
| 2,050,902 | Tatter | Aug. 11, 1936 |
| 2,065,382 | Levy | Dec. 22, 1936 |
| 2,086,538 | Dabney | July 13, 1937 |
| 2,286,532 | Freer | June 16, 1942 |
| 2,311,528 | Freer | Feb. 16, 1943 |
| 2,344,933 | Lambert | Mar. 21, 1944 |
| 2,518,411 | Wilson | Aug. 8, 1950 |

FOREIGN PATENTS

| 521,091 | Germany | Mar. 18, 1931 |